(12) United States Patent
Liu et al.

(10) Patent No.: US 12,468,068 B2
(45) Date of Patent: Nov. 11, 2025

(54) CARBON-BASED CONDUCTIVE FILM-BASED ULTRALIGHT WIDE-ANGLE ABSORBING METAMATERIAL WITH FULL-FREQUENCY ABSORPTION WITHIN 2-18 GHz AND PREPARATION METHOD THEREOF

(71) Applicant: NORTH UNIVERSITY OF CHINA, Taiyuan (CN)

(72) Inventors: Yaqing Liu, Taiyuan (CN); Guizhe Zhao, Taiyuan (CN); Guanyu Han, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 19/024,353

(22) Filed: Jan. 16, 2025

(65) Prior Publication Data
US 2025/0237786 A1      Jul. 24, 2025

Related U.S. Application Data

(63) Continuation of application No. PCT/CN2024/074018, filed on Jan. 25, 2024.

(30) Foreign Application Priority Data

Jan. 19, 2024   (CN) .......................... 202410083767.9

(51) Int. Cl.
*G02B 1/00*    (2006.01)
*H01Q 17/00*    (2006.01)

(52) U.S. Cl.
CPC ........... *G02B 1/002* (2013.01); *H01Q 17/007* (2013.01)

(58) Field of Classification Search
CPC .............................. G02B 1/002; H01Q 17/007
(Continued)

(56) References Cited

U.S. PATENT DOCUMENTS 10,581,172 B2 *   3/2020   Parsche ................. H01Q 13/20
11,135,763 B2 *  10/2021   Beyerle ............... H01Q 17/002
(Continued)

FOREIGN PATENT DOCUMENTS

CN        103700951 A       4/2014
CN        109560390 A       4/2019
(Continued)

OTHER PUBLICATIONS

Fan Yize et al., "Review of microwave absorbing composite based on metamaterial", New Chemical Materials, Mar. 3, 2021, vol. 50, No. 3, pp. 236-239,245.

*Primary Examiner* — Bo Fan

(57) ABSTRACT

A carbon-based conductive film-based ultralight wide-angle absorbing metamaterial with full-frequency absorption within 2-18 GHz, including a first dielectric substrate, a first carbon-based conductive film array structure layer, a second dielectric substrate, a second carbon-based conductive film array structure layer, a third dielectric substrate, and a third carbon-based conductive film array structure layer, which are laminated in sequence with the first dielectric substrate as a bottom. The first, second, and third carbon-based conductive film array structure layers are each composed of discrete carbon-base conductive film patches arranged in a periodic array. A method for preparing such absorbing metamaterial is also provided.

4 Claims, 14 Drawing Sheets

(58) Field of Classification Search
USPC .................................. 342/4, 27, 45, 124, 420
See application file for complete search history.

(56) References Cited

U.S. PATENT DOCUMENTS

| | | | |
|---|---|---|---|
| 2010/0231433 A1* | 9/2010 | Tishin | H05K 9/0075 |
| | | | 264/45.3 |
| 2015/0138009 A1* | 5/2015 | Liu | H01Q 17/008 |
| | | | 342/1 |
| 2022/0108053 A1 | 4/2022 | Daware et al. | |

FOREIGN PATENT DOCUMENTS

| | | |
|---|---|---|
| CN | 113011060 A | 6/2021 |
| CN | 115648496 A | 1/2023 |
| CN | 115882234 A | 3/2023 |
| CN | 116665821 A | 8/2023 |
| CN | 116779067 A | 9/2023 |
| CN | 118094981 A | 5/2024 |
| JP | 2007073662 A | 3/2007 |

* cited by examiner

CARBON-BASED CONDUCTIVE FILM-BASED ULTRALIGHT WIDE-ANGLE ABSORBING METAMATERIAL WITH FULL-FREQUENCY ABSORPTION WITHIN 2-18 GHz AND PREPARATION METHOD THEREOF

CROSS-REFERENCE TO RELATED APPLICATIONS

This application is a continuation of International Patent Application No. PCT/CN2024/074018, filed on Jan. 25, 2024, which claims the benefit of priority from Chinese Patent Application No. 202410083767.9, filed on Jan. 19, 2024. The content of the aforementioned application, including any intervening amendments thereto, is incorporated herein by reference in its entirety.

TECHNICAL FIELD

This application relates to functional composites, and more particularly to a carbon-based conductive film-based ultralight wide-angle absorbing metamaterial with full-frequency absorption within 2-18 GHz and a preparation method thereof.

BACKGROUND

The environmental electromagnetic waves (EMWs) radiation will interfere with the normal operation of devices sensitive to EMWs, such as civil aircraft radios, radars, and aerospace data transceivers, and also potentially threaten human health. Therefore, research and development of EMW-absorbing (EMWA) materials have attracted considerable attention. Carbon-based films, as a typical dielectric material, possess advantages such as low density, good environmental stability, adjustable electron mobility, and designable structural configuration, and thus have been widely considered as a promising EMWA material.

EMWA materials play a significant role in both the military and practical civil engineering. In addition to high EMWA rate, such materials are also required to have a large absorption bandwidth in the actual application. Furthermore, strict requirements are also put forward for mechanical strength, specific gravity, temperature and moisture resistance, radiation resistance, and corrosion resistance of the EMWA materials.

As a novel material with extraordinary physical properties, metamaterials are composed of artificial units arranged in a specific manner. Compared to conventional materials, metamaterials can be precisely regulated in terms of the response frequency band and performance strength, and also have advantages such as light weight and small thickness, making them highly valuable for applications across various fields. As one of application branches of metamaterials, metamaterial absorbers are specialized materials capable of absorbing or scattering EMWs, or altering the propagation direction of EMWs, thereby enabling applications such as mitigating electromagnetic interference, enhancing stealth capabilities, and improving solar cell efficiency.

The conventional metamaterials generally have a classic metal-dielectric-metal unit structure consisting of an electrical ring resonator at the top, a dielectric substrate in the middle, and a metal backboard at the bottom. Such structure has been extensively adopted in both single-layer and multi-layer metamaterial absorbers. However, this structure is highly sensitive to polarization, and struggles with a narrow absorption bandwidth. Moreover, precise alignment is required between the bottom metal backboard and the top metal patch to achieve the optimal absorption performance, and thus the manufacturing process needed to be strictly and precisely controlled.

A considerable number of attempts have been made to improve the absorption bandwidth of metamaterials. However, the absorption bandwidth of the existing metamaterial absorbers is still unsatisfactory. It has been rarely reported on metamaterial absorbers that can span across multiple bands and have an absorption frequency band completely covering multiple bands. Furthermore, the existing broadband metamaterial absorbers are unstable in their absorption bands, where radar wave reflection may still occur. In addition, the polarization stability and absorption stability under large-angle oblique incidence still remain to be optimized. Only materials with stable absorption under wide-angle incidence are suitable for the practical applications.

SUMMARY

An object of the disclosure is to provide a carbon-based conductive film-based ultralight wide-angle absorbing metamaterial with full-frequency absorption within 2-18 GHz and a preparation method thereof through the combination of an ultralight polystyrene foam with a carbon-based conductive film to overcome the defects in the prior art.

Technical solutions of the present disclosure are described as follows.

In a first aspect, this application provides a carbon-based conductive film-based ultralight wide-angle absorbing metamaterial with full-frequency absorption within 2-18 GHz, comprising:

a first dielectric substrate;
a first carbon-based conductive film array structure layer;
a second dielectric substrate;
a second carbon-based conductive film array structure layer;
a third dielectric substrate; and
a third carbon-based conductive film array structure layer;
wherein the first dielectric substrate, the first carbon-based conductive film array structure layer, the second dielectric substrate, the second carbon-based conductive film array structure layer, the third dielectric substrate, and the third carbon-based conductive film array structure layer are laminated in sequence with the first dielectric substrate as a bottom;
the first carbon-based conductive film array structure layer, the second carbon-based conductive film array structure layer, and the third carbon-based conductive film array structure layer are each composed of a plurality of carbon-based conductive film patches in a discrete and periodic arrangement;
each of the plurality of carbon-based conductive film patches constituting the first carbon-based conductive film array structure layer is made of a carbon-based conductive film with an electric resistivity of 1-3 Ω·cm, an electric conductivity of 0.6-1 S/cm, and a sheet resistance of 200-220 Ω/sq;
each of the plurality of carbon-based conductive film patches constituting the second carbon-based conductive film array structure layer and each of the plurality of carbon-based conductive film patches constituting the third carbon-based conductive film array structure layer both are made of a carbon-based conductive film with an electric resistivity of 1-3 Ω·cm, an electric conductivity of 0.4-1 S/cm, and a sheet resistance of 220-260 Ω/sq;

the first carbon-based conductive film array structure layer, the second carbon-based conductive film array structure layer, and the third carbon-based conductive film array structure layer are each arranged in an array of m×n structure units each having a side length P of 50 mm, wherein m and n are each an even number equal to or larger than 4;

each of the m×n structure units of the first carbon-based conductive film array structure layer is the carbon-based conductive film patch with a square structure;

each of the m×n structure units of the second carbon-based conductive film array structure layer is the carbon-based conductive film patch with a square-ring structure; and each of the m×n structure units of the third carbon-based conductive film array structure layer is a pattern composed of four carbon-based conductive film patches each with a square structure.

In some embodiments, the first dielectric substrate, the second dielectric substrate, and the third dielectric substrate are each a polystyrene foam board with a permittivity of 1-1.1, a loss tangent of 0.018, and a density of 19-21 kg/m$^3$.

In some embodiments, a thickness $H_1$ of the first dielectric substrate is 5-7 mm, a thickness $H_2$ of the second dielectric substrate is 9-11 mm, and a thickness $H_3$ of the third dielectric substrate is 4-6 mm.

In some embodiments, the square carbon-based conductive film patch in each of the m×n structure units of the first carbon-based conductive film array structure layer has a side length $L_1$ of 45-49 mm;

the square-ring carbon-based conductive film patch in each of the m×n structure units of the second carbon-based conductive film array structure layer has an inner-ring width $L_2$ of 10-13 mm and an outer-ring width $L_3$ of 11-13 mm; and each of the four square carbon-based conductive film patches in each of the m×n structure units of the third carbon-based conductive film array structure layer has a side length $L_4$ of 14-17 mm.

In some embodiments, the m×n structure units of the first carbon-based conductive film array structure layer, the second carbon-based conductive film array structure layer, and the third carbon-based conductive film array structure layer are each centro-symmetric.

In a second aspect, this application provides a method for preparing the carbon-based conductive film-based ultralight wide-angle absorbing metamaterial described above, comprising:

(1) according to designed length, width, and thickness of each of the first dielectric substrate, the second dielectric substrate, and the third dielectric substrate, cutting a polystyrene foam board product into the first dielectric substrate, the second dielectric substrate, and the third dielectric substrate using a hot wire foam cutting machine;

(2) drawing the m×n structure units of the first carbon-based conductive film array structure layer, the m×n structure units of the second carbon-based conductive film array structure layer, and the m×n structure units of the third carbon-based conductive film array structure layer on a computer followed by printing to obtain printed sheets;

cutting, respectively with the printed sheets as a template, a carbon-based conductive film product into the m×n structure units of the first carbon-based conductive film array structure layer, the m×n structure units of the second carbon-based conductive film array structure layer, and the m×n structure units of the third carbon-based conductive film array structure layer; and (3) marking, by the computer, first areas on the first dielectric substrate respectively corresponding to the m×n structure units of the first carbon-based conductive film array structure layer, and adhesively attaching the m×n structure units of the first carbon-based conductive film array structure layer obtained in step (2) respectively to marked first areas on the first dielectric substrate;

adhesively attaching the second dielectric substrate onto the top of the first carbon-based conductive film array structure layer on the first dielectric substrate; marking, by the computer, second areas on the second dielectric substrate respectively corresponding to the m×n structure units of the second carbon-based conductive film array structure layer; and adhesively attaching the m×n structure units of the second carbon-based conductive film array structure layer obtained in step (2) respectively to marked second areas on the second dielectric substrate; and adhesively attaching the third dielectric substrate onto the top of the second carbon-based conductive film array structure layer on the second dielectric substrate; marking, by the computer, third areas on the third dielectric substrate respectively corresponding to the m×n structure units of the third carbon-based conductive film array structure layer; and adhesively attaching the m×n structure units of the third carbon-based conductive film array structure layer obtained in step (2) to marked third areas on the third dielectric substrate to obtain the carbon-based conductive film-based ultralight wide-angle absorbing metamaterial.

Compared to the prior art, the present disclosure has the following beneficial effects.

(1) Due to the miniaturized design of the structure units, oblique incidence responses of the metamaterial provided herein reach 45° and 60° under transverse electric (TE) and transverse magnetic (TM) polarization modes, respectively. Even in the case of a 60° incidence angle under the TM polarization, its EMW energy absorption can still reach 80%.

(2) The present disclosure utilizes carbon-based conductive film-based absorption layers to replace the metallically-patterned metastructures that are widely adopted currently. In combination with the ultralight polystyrene foam, the entire metamaterial provided herein is extremely light, with a density of merely 20 kg/m$^3$ and a weight of 0.4-0.5 kg/m$^2$, which is merely 1/100 the weight of traditional absorbers of the same size.

DETAILED DESCRIPTION OF EMBODIMENTS

The technical solutions of the present disclosure will be described clearly and completely below in conjunction with the embodiments.

Example 1

Figure 1A:
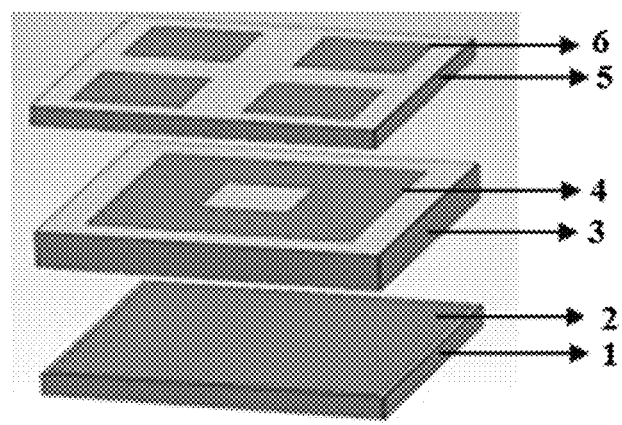
FIGS. 1A-D show a structure unit of the carbon-based conductive film-based ultralight wide-angle absorbing metamaterial with full-frequency absorption within 2-18 GHz prepared in Example 1 of the present disclosure, where A: overall structure of a structure unit; B: a structure unit of a first carbon-based conductive film array structure layer pasted on a structure unit of a first dielectric substrate; C: a structure unit of a second carbon-based conductive film array structure layer pasted on a structure unit of a second dielectric substrate; and D: a structure unit of a third carbon-based conductive film array structure layer pasted on a structure unit of a third dielectric substrate.
Figure 1B:
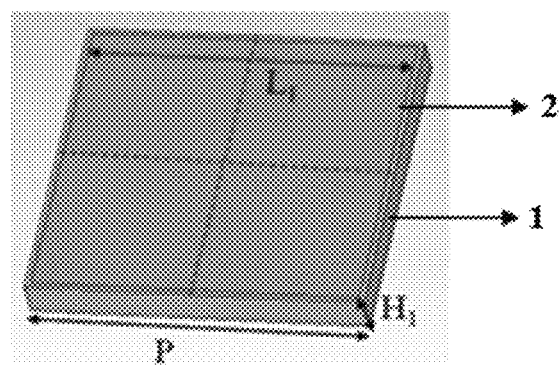
Figure 1C:
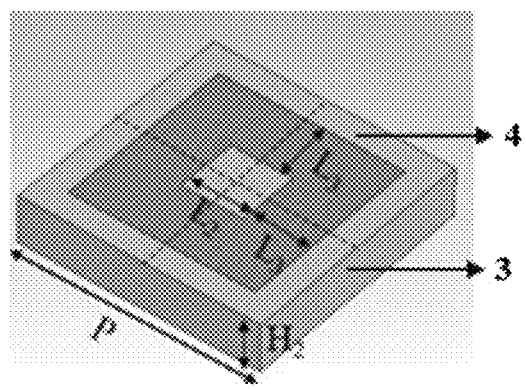
Figure 1D:
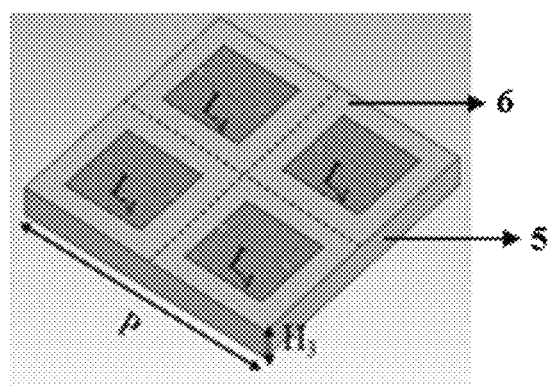
Figure 2:
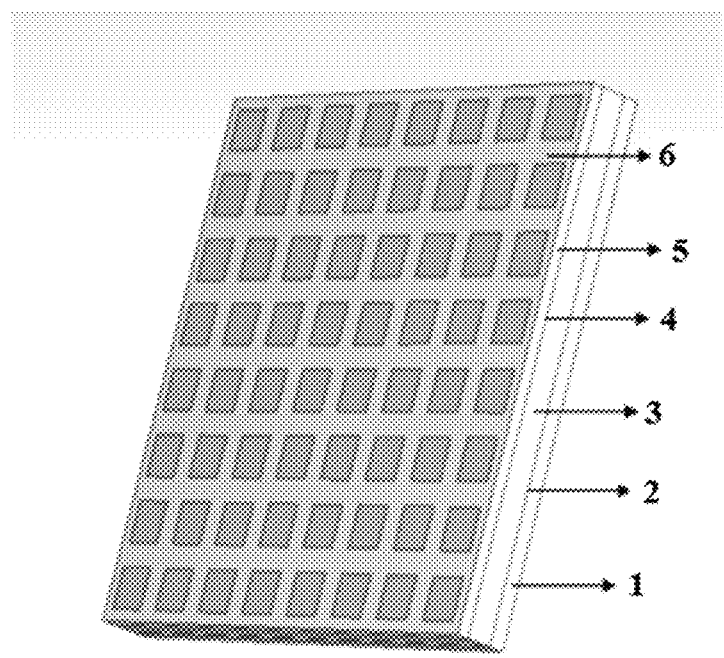
FIG. 2 schematically shows an overall structure of the ultralight wide-angle absorbing metamaterial with full-frequency absorption within 2-18 GHz prepared in Example 1 of the present disclosure.

Provided herein is a carbon-based conductive film-based ultralight wide-angle absorbing metamaterial with full-frequency absorption over 2-18 GHz, which is structurally shown in FIG. 2. And the structure units making up the absorbing metamaterial are shown in FIGS. 1A-1D. The absorbing metamaterial provided herein includes a first dielectric substrate 1, a first carbon-based conductive film array structure layer 2, a second dielectric substrate 3, a second carbon-based conductive film array structure layer 4, a third dielectric substrate 5, and a third carbon-based conductive film array structure layer 6, which are laminated in sequence with the first dielectric substrate 1 as the bottom and the third carbon-based conductive film array structure layer 6 as the top (with the EMW incident direction as the "top").

The first dielectric substrate 1 is a polystyrene foam board, with a permittivity of 1.1, a loss tangent of 0.018, a density of 20 kg/m$^3$, and a thickness $H_1$ of 6.1 mm.

The second dielectric substrate 3 is a polystyrene foam board, with a permittivity of 1.1, a loss tangent of 0.018, a density of 20 kg/m$^3$, and a thickness $H_2$ of 10.3 mm.

The third dielectric substrate 5 is a polystyrene foam board, with a permittivity of 1.1, a loss tangent of 0.018, a density of 20 kg/m$^3$, and a thickness $H_3$ of 4.65 mm.

Figure 3:
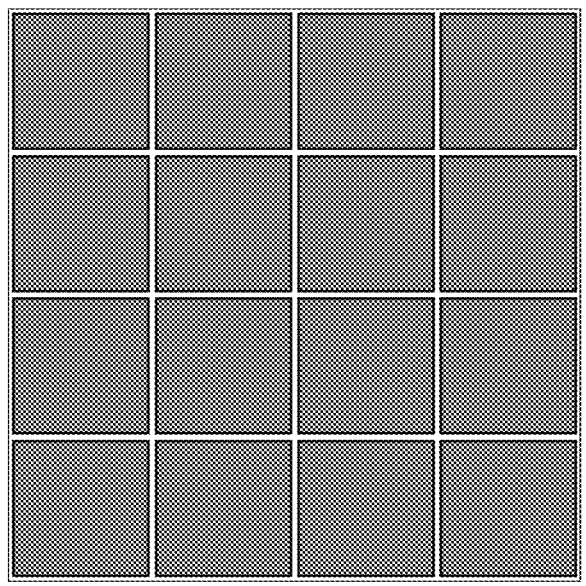
FIG. 3 schematically shows the first carbon-based conductive film array structure layer of the ultralight wide-angle absorbing metamaterial prepared in Example 1 of the present disclosure, where the structure units are arranged in a 4×4 array.

As structurally shown in FIG. 3, the first carbon-based conductive film array structure layer 2 is composed of square carbon-based conductive film patches arranged periodically in an array of 4×4 structure units each having a side length P of 50 mm (as shown in FIG. 1B). The square patch in each structure unit of the first carbon-based conductive film array structure layer 2 has a side length $L_1$ of 48.7 mm. The carbon-based conductive film for preparing the square patch structure units of the first carbon-based conductive film array structure layer 2 is a commercial carbon-based conductive film prepared from carbon black and carbon nanotubes, with an electric resistivity of 1.366 Ω·cm, an electric conductivity of 0.7325 S/cm, and a sheet resistance of 210 Ω/sq.

Figure 4:
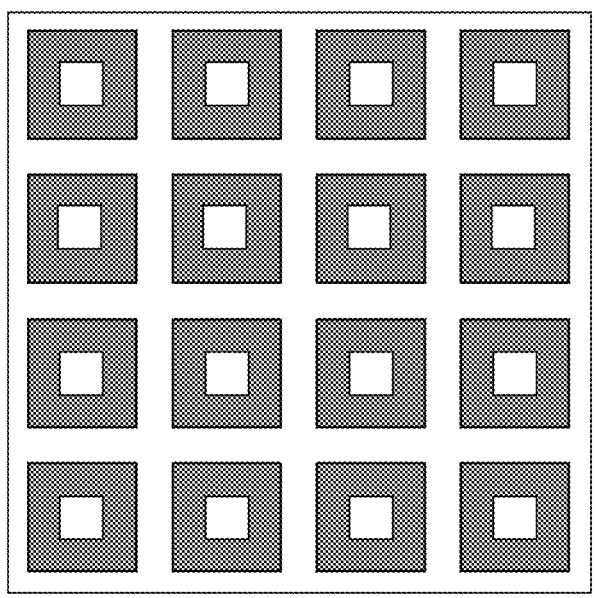
FIG. 4 schematically shows the second carbon-based conductive film array structure layer of the ultralight wide-angle absorbing metamaterial prepared in Example 1 of the present disclosure, where the structure units are arranged in a 4×4 array.

As structurally shown in FIG. 4, the second carbon-based conductive film array structure layer 4 is composed of square-ring carbon-based conductive film patches arranged periodically in an array of 4×4 structure units each having a side length P of 50 mm (as shown in FIG. 1C). The square-ring patch in each structure unit of the second carbon-based conductive film array structure layer 4 has an inner-ring width $L_2$ of 12.8 mm and an outer-ring width $L_3$ of 12.9 mm. The carbon-based conductive film for preparing the square-ring patch structure units of the second carbon-based conductive film array structure layer 4 is a commercial carbon-based conductive film prepared from carbon black and carbon nanotubes, with an electric resistivity of 2.17 Ω·cm, an electric conductivity of 0.4610 S/cm, and a sheet resistance of 220 Ω/sq.

Figure 5:
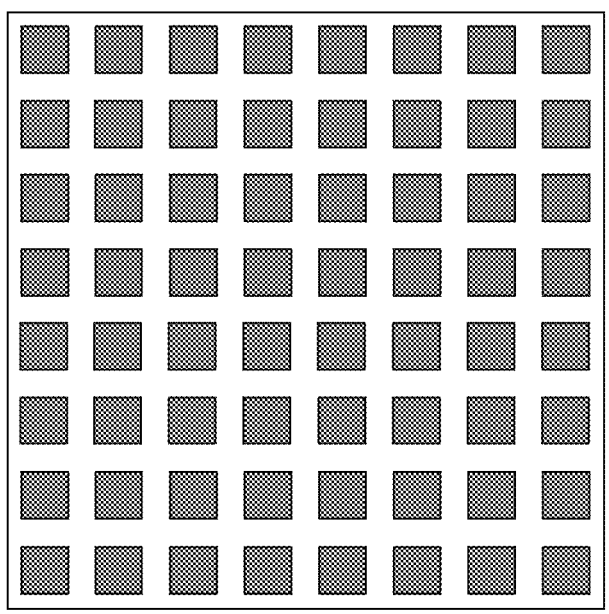
FIG. 5 schematically shows the third carbon-based conductive film array structure layer of the ultralight wide-angle absorbing metamaterial prepared in Example 1 of the present disclosure, where the structure units are arranged in a 4×4 array.

As structurally shown in FIG. 5, the third carbon-based conductive film array structure layer 6 is composed of four square carbon-based conductive film patches arranged periodically in an array of 4×4 structure units each having a side length P of 50 mm (as shown in FIG. 1D). The four square patches in each structure unit of the third carbon-based conductive film array structure layer 6 has a side length $L_4$ of 15.9 mm. The carbon-based conductive film for preparing the square patch structure units of the third carbon-based conductive film array structure layer 6 is a commercial carbon-based conductive film prepared from carbon black and carbon nanotubes, with an electric resistivity of 2.17 Ω·cm, an electric conductivity of 0.4610 S/cm, and a sheet resistance of 220 Ω/sq.

The ultralight wide-angle absorbing metamaterial is prepared as follows.
(1) A foam board produced by Shanxi Sihai Youcheng Construction Materials Technology Co., Ltd using a high-density polystyrene resin is cut into the third dielectric substrate 5 with a dimension of 200 mm×200 mm×4.6 mm, the second dielectric substrate 3 with a dimension of 200 mm×200 mm×6.1 mm and the first dielectric substrate 1 with a dimension of 200 mm×200 mm×10.3 mm by using a hot wire foam cutting machine.

(2) The 4×4 structure units of the first carbon-based conductive film array structure layer 2, the 4×4 structure units of the second carbon-based conductive film array structure layer 4, and the 4×4 structure units of the third carbon-based conductive film array structure layer 6 are drawn on a computer and then printed to obtain printed sheets. The purchased carbon-based conductive film products are cut into the 4×4 structure units of the first carbon-based conductive film array structure layer 2, the 4>4 structure units of the second carbon-based conductive film array structure layer 4, and the 4×4 structure units of the third carbon-based conductive film array structure layer 6, respectively, with the printed sheets used as templates.

(3) First areas on the first dielectric substrate 1 corresponding to the 4×4 structure units of the first carbon-based conductive film array structure layer 2 are marked by the computer, and the 4×4 structure units of the first carbon-based conductive film array structure layer 2 obtained in step (2) are adhesively attached to the marked first areas on the first dielectric substrate 1, respectively.

The second dielectric substrate 3 is adhesively attached onto the top of the first carbon-based conductive film array structure layer 2 on the first dielectric substrate 1. Second areas on the second dielectric substrate 3 corresponding to the 4×4 structure units of the second carbon-based conductive film array structure layer 4 are marked by the computer, and the 4×4 structure units of the second carbon-based conductive film array structure layer 4 obtained in step (2) are adhesively attached to the marked second areas on the second dielectric substrate 3, respectively.

The third dielectric substrate 5 is adhesively attached onto the top of the second carbon-based conductive film array structure layer 4 on the second dielectric substrate 3. Third areas on the third dielectric substrate 5 corresponding to the 4×4 structure units of the third carbon-based conductive film array structure layer 6 are marked by the computer, and the 4×4 structure units of the third carbon-based conductive film array structure layer 6 obtained in step (2) are adhesively attached to the marked third areas on the third dielectric substrate 5, respectively, resulting in the carbon-based conductive film-based ultralight wide-angle absorbing metamaterial with a dimension of 200 mm×200 mm×21 mm.

Figure 6:
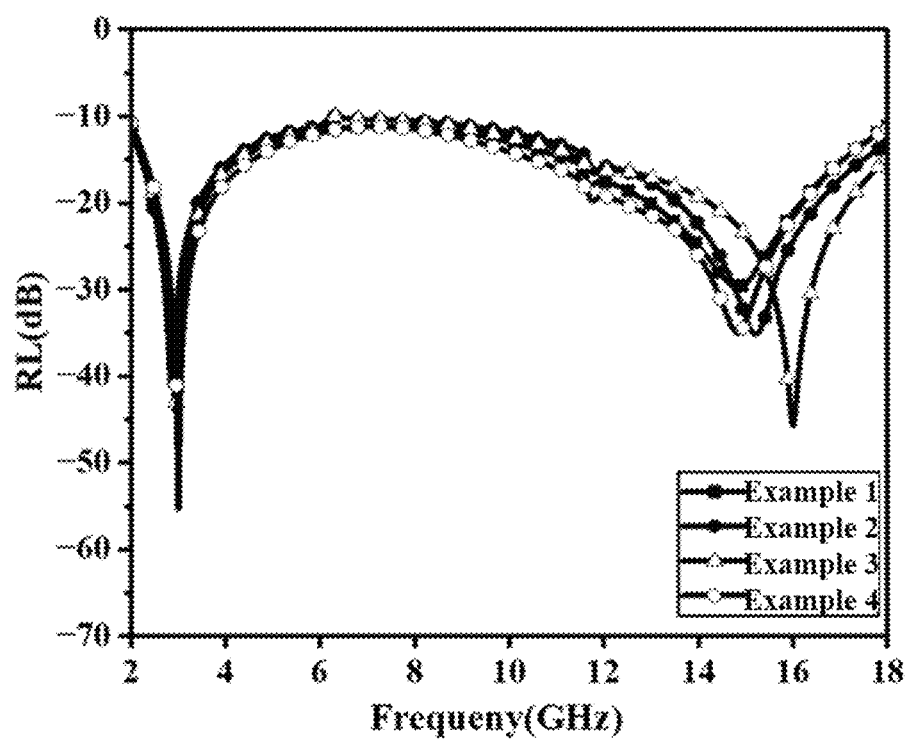
FIG. 6 displays EMW reflection loss (RL) simulation curves of the ultralight wide-angle absorbing metamaterials prepared in Example 1, Example 2, Example 3, and Example 4 of the present disclosure within a frequency range of 2-18 GHz.
Figure 7:
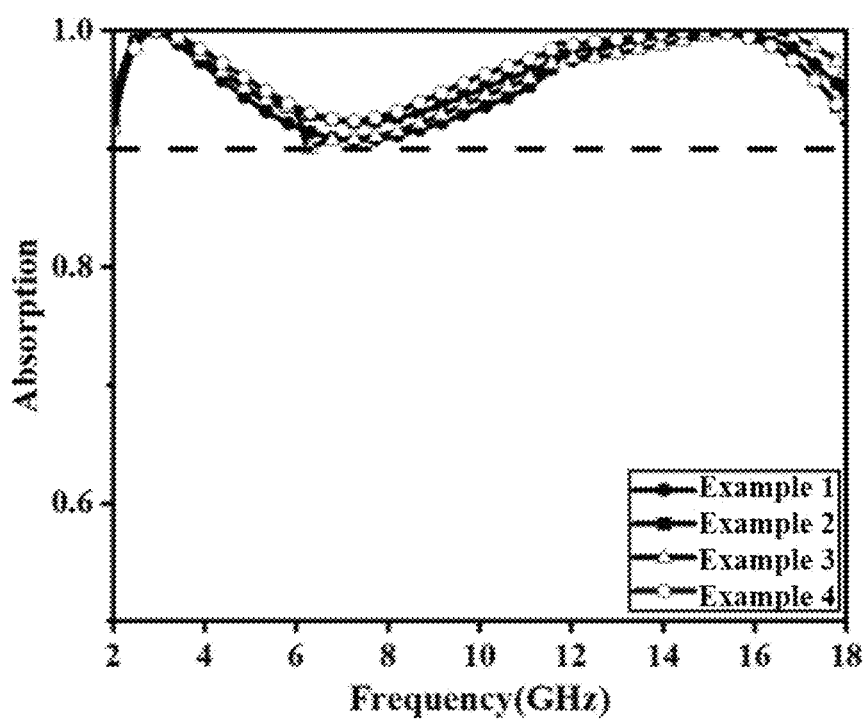
FIG. 7 shows normalized absorption simulation curves of the ultralight wide-angle absorbing metamaterials prepared in Example 1, Example 2, Example 3, and Example 4 of the present disclosure within the frequency range of 2-18 GHZ.
Figure 8:
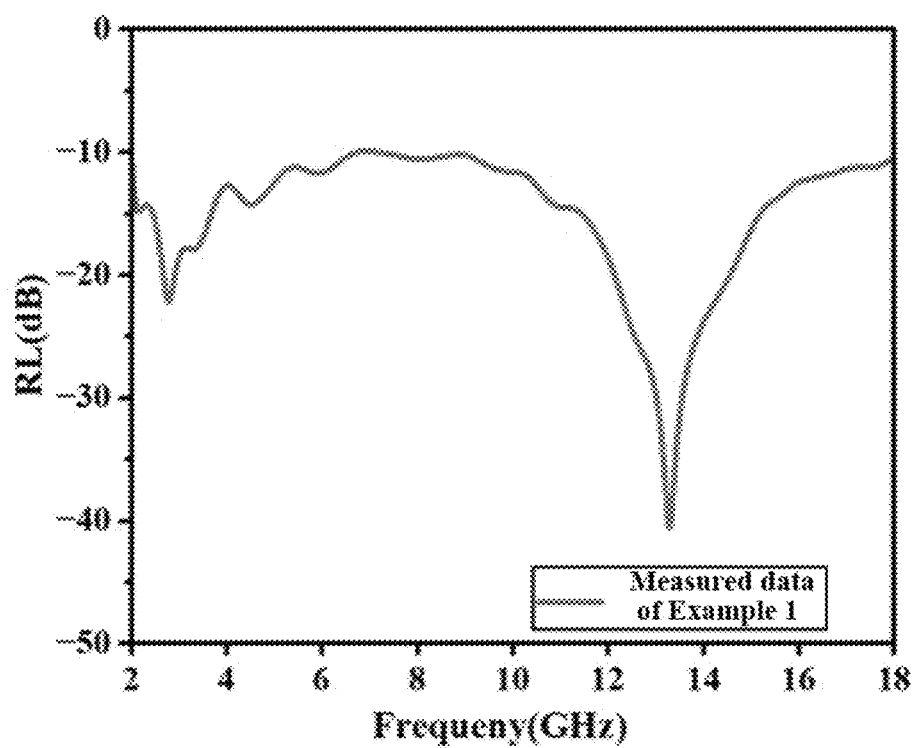
FIG. 8 shows a measured RL curve of the ultralight wide-angle absorbing metamaterial prepared in Example 1 of the present disclosure within the frequency range of 2-18 GHz.

As shown in FIGS. 6-8, a minimum reflection loss ($RL_{min}$) of the ultralight wide-angle absorbing metamaterial provided herein appears at 13.28 GHz, where a strong absorption of −40.57 dB is generated. Moreover, an effective absorption bandwidth (RL≤−10 dB) within the 2-18 GHz ultrawide frequency band is 16 GHz.

Figure 9:
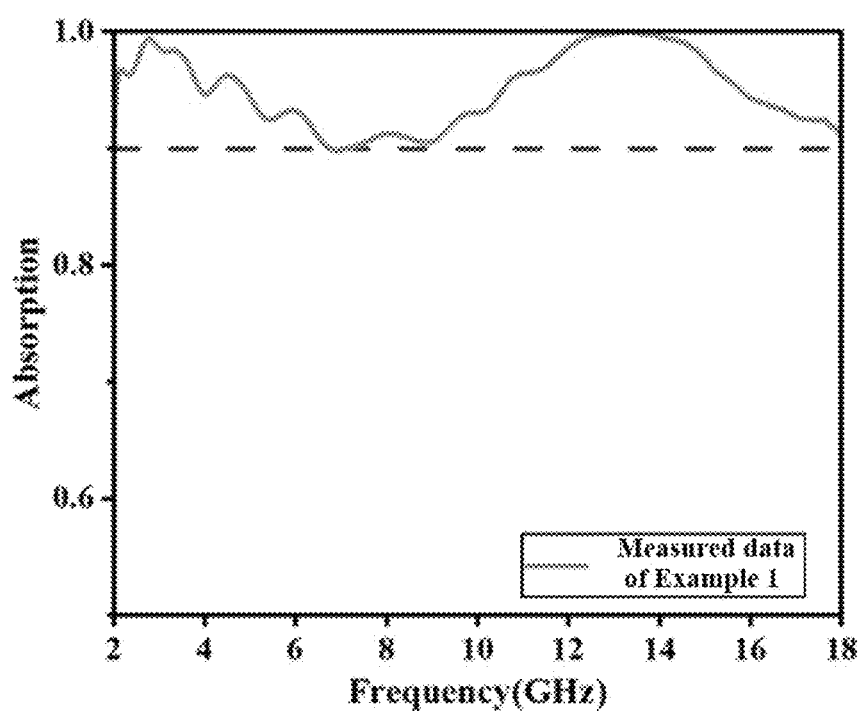
FIG. 9 shows a measured normalized absorption curve of the ultralight wide-angle absorbing metamaterial prepared in Example 1 of the present disclosure within the frequency range of 2-18 GHz.

As shown in FIGS. 7 and 9, a normalized absorption rate of the ultralight wide-angle absorbing metamaterial obtained herein can reach 90% or more (RL≤−10 dB) within the 2-18 GHz ultrawide frequency band. Moreover, the normalized absorption rates at 2.79 GHz and 13.28 GHz are close to 100%, achieving high-efficiency absorption.

Figure 10A:
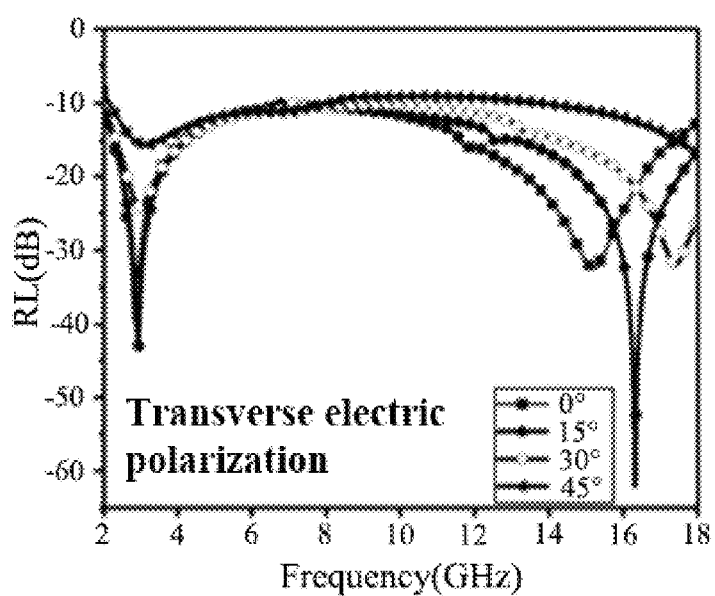
FIGS. 10A-B schematically show RL simulation results of the ultralight wide-angle absorbing metamaterial prepared in Example 1 of the present disclosure at different incidence angles, where 10A: under the transverse electric (TE) polarization mode; and 10B: under the transverse magnetic (TM) polarization mode.
Figure 10B:
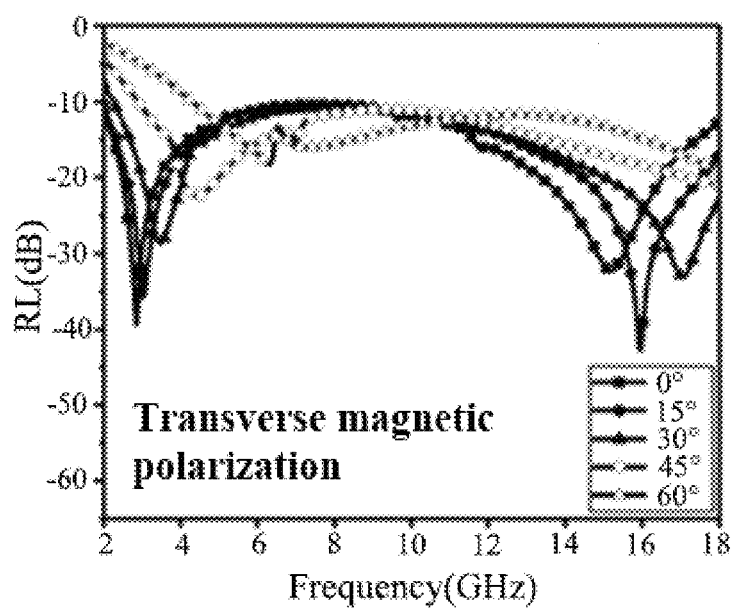

As shown in FIG. 10A, under a transverse electric (TE) polarization mode, when the incident angle increases from 0° to 45°, the metamaterial obtained herein exhibits a stable strong absorption performance (with an absorption rate greater than 90%). As shown in FIG. 10B, under a transverse magnetic (TM) polarization mode, when the incident angle increases from 0° to 60°, the absorption rate of the metamaterial only slightly decreases in the low-frequency band, while the overall absorption rate remains stable and presents good angular stability. The results revealed by FIGS. 10A-10B demonstrate that the metamaterial absorber provided herein has excellent polarization stability and angular insensitivity, which can be attributed to the strong symmetry and miniaturized design of the structure units. Under the TE and TM polarization modes, the oblique incidence responses reach 45° and 60°, respectively.

Example 2

Provided herein is a carbon-based conductive film-based ultralight wide-angle absorbing metamaterial with full-frequency absorption over 2-18 GHz, which is structurally shown in FIG. 2. And the structure units making up the absorbing metamaterial are shown in FIGS. 1A-1D. The absorbing metamaterial provided herein includes a first dielectric substrate 1, a first carbon-based conductive film array structure layer 2, a second dielectric substrate 3, a second carbon-based conductive film array structure layer 4, a third dielectric substrate 5, and a third carbon-based conductive film array structure layer 6, which are laminated in sequence with the first dielectric substrate 1 as the bottom and the third carbon-based conductive film array structure layer 6 as the top (with the EMW incident direction as the "top").

The first dielectric substrate 1 is a polystyrene foam board, with a permittivity of 1.1, a loss tangent of 0.018, a density of 20 kg/m$^3$, and a thickness $H_1$ of 6.1 mm.

The second dielectric substrate 3 is a polystyrene foam board, with a permittivity of 1.1, a loss tangent of 0.018, a density of 20 kg/m$^3$, and a thickness $H_2$ of 9.8 mm.

The third dielectric substrate 5 is a polystyrene foam board, with a permittivity of 1.1, a loss tangent of 0.018, a density of 20 kg/m$^3$, and a thickness $H_3$ of 5.1 mm.

As structurally shown in FIG. 3, the first carbon-based conductive film array structure layer 2 is composed of square carbon-based conductive film patches arranged periodically in an array of 4×4 structure units each having a side length P of 50 mm (as shown in FIG. 1B). The square patch in each structure unit of the first carbon-based conductive film array structure layer 2 has a side length $L_1$ of 48.7 mm. The carbon-based conductive film for preparing the square patch structure units of the first carbon-based conductive film array structure layer 2 is a commercial carbon-based conductive film prepared from carbon black and carbon nanotubes, with an electric resistivity of 1.4 Ω·cm, an electric conductivity of 0.8 S/cm and a sheet resistance of 210 Ω/sq.

As structurally shown in FIG. 4, the second carbon-based conductive film array structure layer 4 is composed of square-ring carbon-based conductive film patches arranged periodically in an array of 4×4 structure units each having a side length P of 50 mm (as shown in FIG. 1C). The square-ring patch in each unit structure of the second carbon-based conductive film array structure layer 4 has an inner-ring width $L_2$ of 12.8 mm and an outer-ring width $L_3$ of 12.9 mm. The carbon-based conductive film for preparing the square-ring patch structure units of the second carbon-based conductive film array structure layer 4 is a commercial carbon-based conductive film prepared from carbon black and carbon nanotubes, with an electric resistivity of 2.3 Ω·cm, an electric conductivity of 0.6 S/cm and a sheet resistance of 220 Ω/sq.

As structurally shown in FIG. 5, the third carbon-based conductive film array structure layer 6 is composed of four square carbon-based conductive film patches arranged periodically in an array of 4×4 structure units each having a side length P of 50 mm (as shown in FIG. 1D). The four square patches in each unit structure of the third carbon-based conductive film array structure layer 6 has a side length $L_4$ of 15.9 mm. The carbon-based conductive film for preparing the square patch structure units of the third carbon-based conductive film array structure layer 6 is a commercial carbon-based conductive film prepared from carbon black and carbon nanotubes, with an electric resistivity of 2.3 Ω·cm, an electric conductivity of 0.6 S/cm and a sheet resistance of 220 Ω/sq.

The method of preparing the ultralight wide-angle absorbing metamaterial provided herein is different from that provided in Example 1 merely in the differences in materials and structural parameters.

As shown in FIG. 6, the $RL_{min}$ of the ultralight wide-angle absorbing metamaterial provided herein appears at 2.96 GHz, where a strong absorption of −41.12 dB is generated. Moreover, an effective absorption bandwidth (RL≤−10 dB) within the 2-18 GHz ultrawide frequency band is 16 GHz.

As shown in FIG. 7, a normalized absorption rate of the ultralight wide-angle absorbing metamaterial obtained herein can reach 90% or more (RL≤−10 dB) within the 2-18 GHz ultrawide frequency band. Moreover, the normalized absorption rates at 2.96 GHz and 15.22 GHz are close to 100%, achieving high-efficiency absorption.

Example 3

Provided herein is a carbon-based conductive film-based ultralight wide-angle absorbing metamaterial with full-frequency absorption over 2-18 GHz, which is structurally shown in FIG. 2. And the structure units making up the absorbing metamaterial are shown in FIGS. 1A-1D. The absorbing metamaterial provided herein includes a first dielectric substrate 1, a first carbon-based conductive film array structure layer 2, a second dielectric substrate 3, a second carbon-based conductive film array structure layer 4, a third dielectric substrate 5, and a third carbon-based conductive film array structure layer 6, which are laminated in sequence with the first dielectric substrate 1 as the bottom and the third carbon-based conductive film array structure layer 6 as the top (with the EMW incident direction as the "top").

The first dielectric substrate 1 is a polystyrene foam board, with a permittivity of 1, a loss tangent of 0.018, a density of 19 kg/m³, and a thickness $H_1$ of 5 mm.

The second dielectric substrate 3 is a polystyrene foam board, with a permittivity of 1, a loss tangent of 0.018, a density of 19 kg/m³, and a thickness $H_2$ of 9 mm.

The third dielectric substrate 5 is a polystyrene foam board, with a permittivity of 1, a loss tangent a of 0.018, a density of 19 kg/m³, and a thickness $H_3$ of 4 mm.

As structurally shown in FIG. 3, the first carbon-based conductive film array structure layer 2 is composed of square carbon-based conductive film patches arranged periodically in an array of 4×4 structure units each having a side length P of 50 mm (as shown in FIG. 1B). The square patch in each structure unit of the first carbon-based conductive film array structure layer 2 has a side length $L_1$ of 45 mm. The carbon-based conductive film for preparing the square patch structure units of the first carbon-based conductive film array structure layer 2 is a commercial carbon-based conductive film prepared from carbon black and carbon nanotubes, with an electric resistivity of 1.2 Ω·cm, an electric conductivity of 0.6 S/cm, and a sheet resistance of 200 Ω/sq.

As structurally shown in FIG. 4, the second carbon-based conductive film array structure layer 4 is composed of square-ring carbon-based conductive film patches arranged periodically in an array of 4×4 structure units each having a side length P of 50 mm (as shown in FIG. 1C). The square-ring patch in each structure unit of the second carbon-based conductive film array structure layer 4 has an inner-ring width $L_2$ of 10 mm and an outer-ring width $L_3$ of 11 mm. The carbon-based conductive film for preparing the square-ring patch structure units of the second carbon-based conductive film array structure layer 4 is a commercial carbon-based conductive film prepared from carbon black and carbon nanotubes, with an electric resistivity of 2.3 Ω·cm, an electric conductivity of 0.5 S/cm and a sheet resistance of 230 Ω/sq.

As structurally shown in FIG. 5, the third carbon-based conductive film array structure layer 6 is composed of four square carbon-based conductive film patches arranged periodically in an array of 4×4 structure units each having a side length P of 50 mm (as shown in FIG. 1D). The four square patches in each structure unit of the third carbon-based conductive film array structure layer 6 has a side length $L_4$ of 14 mm. The carbon-based conductive film for preparing the square patch structure units of the third carbon-based conductive film array structure layer 6 is a commercial carbon-based conductive film prepared from carbon black and carbon nanotubes, with an electric resistivity of 2.3 Ω·cm, an electric conductivity of 0.5 S/cm and a sheet resistance of 230 Ω/sq.

The method of preparing the ultralight wide-angle absorbing metamaterial provided herein is different from that provided in Example 1 merely in the differences in materials and structural parameters.

As shown in FIG. 6, the $RL_{min}$ of the ultralight wide-angle absorbing metamaterial provided herein appears at 15.98 GHz, where a strong absorption of −45.63 dB is generated. Moreover, an effective absorption bandwidth (RL≤−10 dB) within the 2-18 GHz ultrawide frequency band is 16 GHz.

As shown in FIG. 7, a normalized absorption rate of the ultralight wide-angle absorbing metamaterial obtained herein can reach 90% or more (RL≤−10 dB) within the 2-18 GHz ultrawide frequency band. Moreover, the normalized absorption rates at 2.98 GHz and 15.98 GHz are close to 100%, achieving high-efficiency absorption.

Example 4

Provided herein is a carbon-based conductive film-based ultralight wide-angle absorbing metamaterial with full-frequency absorption over 2-18 GHz, which is structurally shown in FIG. 2. And the structure units making up the absorbing metamaterial is shown in FIGS. 1A-1D. The absorbing metamaterial provided herein includes a first dielectric substrate 1, a first carbon-based conductive film array structure layer 2, a second dielectric substrate 3, a second carbon-based conductive film array structure layer 4, a third dielectric substrate 5, and a third carbon-based conductive film array structure layer 6, which are laminated in sequence with the first dielectric substrate 1 as the bottom and the third carbon-based conductive film array structure layer 6 as the top (with the EMW incident direction as the "top").

The first dielectric substrate 1 is a polystyrene foam board, with a permittivity of 1, a loss tangent of 0.018, a density of 21 kg/m³, and a thickness $H_1$ of 7 mm.

The second dielectric substrate 3 is a polystyrene foam board, with a permittivity of 1, a loss tangent of 0.018, a density of 21 kg/m³, and a thickness $H_2$ of 11 mm.

The third dielectric substrate 5 is a polystyrene foam board, with a permittivity of 1, a loss tangent of 0.018, a density of 21 kg/m³, and a thickness $H_3$ of 6 mm.

As structurally shown in FIG. 3, the first carbon-based conductive film array structure layer 2 is composed of square carbon-based conductive film patches arranged periodically in an array of 4×4 structure units each having a side length P of 50 mm (as shown in FIG. 1B). The square patch in each structure unit of the first carbon-based conductive film array structure layer 2 has a side length $L_1$ of 49 mm. The carbon-based conductive film for preparing the square patch structure units of the first carbon-based conductive film array structure layer 2 is a commercial carbon-based conductive film prepared from carbon black and carbon nanotubes, with an electric resistivity of 1.5 Ω·cm, an electric conductivity of 1.0 S/cm and a sheet resistance of 220 Ω/sq.

As structurally shown in FIG. 4, the second carbon-based conductive film array structure layer 4 is composed of square-ring carbon-based conductive film patches arranged periodically in an array of 4×4 structure units each having a side length P of 50 mm (as shown in FIG. 1C). The square-ring patch in each structure unit of the second carbon-based conductive film array structure layer 4 has an inner-ring width $L_2$ of 13 mm and an outer-ring width $L_3$ of 13 mm. The carbon-based conductive film for preparing the square-ring patch structure units of the second carbon-based conductive film array structure layer 4 is a commercial carbon-based conductive film prepared from carbon black and carbon nanotubes, with an electric resistivity of 3.0 Ω·cm, an electric conductivity of 1.0 S/cm and a sheet resistance of 260 Ω/sq.

As structurally shown in FIG. 5, the third carbon-based conductive film array structure layer 6 is composed of four square carbon-based conductive film patches arranged periodically in an array of 4×4 structure units each having a side length P of 50 mm (as shown in FIG. 1D). The four square patches in each structure unit of the third carbon-based conductive film array structure layer 6 has a side length $L_4$ of 17 mm. The carbon-based conductive film is a commercial carbon-based conductive film for preparing the square patch structure units of the third carbon-based conductive film array structure layer 6 prepared from carbon black and carbon nanotubes, with an electric resistivity of 3.0 Ω·cm, an electric conductivity of 1.0 S/cm and a sheet resistance of 260 Ω/sq.

The method of preparing the ultralight wide-angle absorbing metamaterial provided herein is different from that provided in Example 1 merely in the differences in materials and structural parameters.

As shown in FIG. 6, the $RL_{min}$ of the ultralight wide-angle absorbing metamaterial provided herein appears at 3.01 GHz, where a strong absorption of −55.38 dB is generated. Moreover, an effective absorption bandwidth (RL≤−10 dB) within the 2-18 GHz ultrawide frequency band is 16 GHz.

As shown in FIG. 7, a normalized absorption rate of the ultralight wide-angle absorbing metamaterial obtained herein can reach 90% or more (RL≤−10 dB) within the 2-18 GHz ultrawide frequency band. Moreover, the normalized absorption rates at 3.01 GHz and 14.83 GHz are close to 100%, achieving high-efficiency absorption.

It should be understood that the structural dimensions described above are merely exemplary and provided for illustrative purposes. Specific dimensional variations should be determined based on actual conditions, and the present disclosure is not limited to these particular measurements.

Described above are merely preferred embodiments of the present disclosure, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A carbon-based conductive film-based ultralight wide-angle absorbing metamaterial with full-frequency absorption within 2-18 GHz, comprising:
   a first dielectric substrate;
   a first carbon-based conductive film array structure layer;
   a second dielectric substrate;
   a second carbon-based conductive film array structure layer;
   a third dielectric substrate; and
   a third carbon-based conductive film array structure layer;
   wherein the first dielectric substrate, the first carbon-based conductive film array structure layer, the second dielectric substrate, the second carbon-based conductive film array structure layer, the third dielectric substrate, and the third carbon-based conductive film array structure layer are laminated in sequence with the first dielectric substrate as a bottom;
   the first carbon-based conductive film array structure layer is composed of a plurality of first carbon-based conductive film patches each having a square structure in a discrete and periodic arrangement, the second carbon-based conductive film array structure layer is composed of a plurality of second carbon-based conductive film patches each having a square-ring structure in a discrete and periodic arrangement, and the third carbon-based conductive film array structure layer is composed of a plurality of third carbon-based conductive film patches each having a square structure in a discrete and periodic arrangement;
   each of the plurality of first carbon-based conductive film patches is made of a carbon-based conductive film with an electric resistivity of 1-3 Ω·cm, an electric conductivity of 0.6-1 S/cm, and a sheet resistance of 200-220 Ω/sq; each of the plurality of second carbon-based conductive film patches and each of the plurality of third carbon-based conductive film patches both are made of a carbon-based conductive film with an electric resistivity of 1-3 Ω·cm, an electric conductivity of 0.4-1 S/cm, and a sheet resistance of 220-260 Ω/sq;
   the first carbon-based conductive film array structure layer, the second carbon-based conductive film array structure layer, and the third carbon-based conductive film array structure layer are each arranged in an array of m×n structure units each having a side length P of 50 mm, wherein m and n are each an even number equal to or larger than 4;
   each of the m×n structure units of the first carbon-based conductive film array structure layer is one of the plurality of first carbon-based conductive film patches having the square structure; each of the m×n structure units of the second carbon-based conductive film array structure layer is one of the plurality of second carbon-based conductive film patches having the square-ring structure;
   each of the m×n structure units of the third carbon-based conductive film array structure layer is a pattern composed of four of the plurality of third carbon-based conductive film patches having the square structure; and the first dielectric substrate, the second dielectric substrate, and the third dielectric substrate are each a polystyrene foam board with a permittivity of 1-1.1, a loss tangent of 0.018, and a density of 19-21 kg/m$^3$.

2. The carbon-based conductive film-based ultralight wide-angle absorbing metamaterial of claim 1, wherein a thickness $H_1$ of the first dielectric substrate is 5-7 mm, a thickness $H_2$ of the second dielectric substrate is 9-11 mm, and a thickness $H_3$ of the third dielectric substrate is 4-6 mm.

3. The carbon-based conductive film-based ultralight wide-angle absorbing metamaterial of claim 1, wherein one of the plurality of first carbon-based conductive film patches having the square structure in each of the m×n structure units of the first carbon-based conductive film array structure layer has a side length $L_1$ of 45-49 mm;
    one of the plurality of second carbon-based conductive film patches having the square-ring structure in each of the m×n structure units of the second carbon-based conductive film array structure layer has an inner-ring width $L_2$ of 10-13 mm and an outer-ring width $L_3$ of 11-13 mm; and
    each of the four third carbon-based conductive film patches having the square structure in each of the m×n structure units of the third carbon-based conductive film array structure layer has a side length $L_4$ of 14-17 mm.

4. The carbon-based conductive film-based ultralight wide-angle absorbing metamaterial of claim 1, wherein the m×n structure units of the first carbon-based conductive film array structure layer, the second carbon-based conductive film array structure layer, and the third carbon-based conductive film array structure layer each have a centro-symmetric pattern.

* * * * *